United States Patent
Imaizumi

[19]

[11] Patent Number: 5,980,808
[45] Date of Patent: Nov. 9, 1999

[54] METHOD AND APPARATUS FOR PRODUCING A TUBULAR CONTAINER WHILE MAINTAINING A SHOULDER SECTION THEREOF AT A DESIRED THICKNESS, AND METHOD FOR PRODUCING A MARBLEIZED PATTERN ON A MULTI-LAYER TUBULAR CONTAINER

[75] Inventor: Yasuyuki Imaizumi, Tokyo, Japan

[73] Assignee: Yoshino Kogyosho Co., Ltd., Tokyo, Japan

[ * ] Notice: This patent is subject to a terminal disclaimer.

[21] Appl. No.: 08/894,713

[22] PCT Filed: Dec. 26, 1996

[86] PCT No.: PCT/JP96/03833

§ 371 Date: Aug. 26, 1997

§ 102(e) Date: Aug. 26, 1997

[87] PCT Pub. No.: WO97/24219

PCT Pub. Date: Jul. 10, 1997

[30] Foreign Application Priority Data

Dec. 28, 1995 [JP] Japan .................................... 7-343444
Mar. 18, 1996 [JP] Japan .................................... 8-061254

[51] Int. Cl.⁶ .......................... B29C 33/02; B29C 43/20; B29C 57/00; B29C 61/02

[52] U.S. Cl. .......................... 264/296; 264/230; 264/322; 264/327; 264/519; 425/384; 425/392; 425/393; 425/525

[58] Field of Search ..................... 264/230, 259, 264/322, 327, 516, 519, 296; 425/392, 393, 398, 525, 384

[56] References Cited

U.S. PATENT DOCUMENTS

| | | | |
|---|---|---|---|
| 3,226,464 | 12/1965 | Saumsigle et al. | 264/327 |
| 4,803,024 | 2/1989 | Nilsson | 264/80 |
| 4,828,892 | 5/1989 | Kersten et al. | 428/35.2 |
| 5,069,586 | 12/1991 | Holoubek et al. | 264/519 |
| 5,712,009 | 1/1998 | Moore et al. | 428/35.7 |

FOREIGN PATENT DOCUMENTS

| | | |
|---|---|---|
| 2 0-475126 | 3/1992 | European Pat. Off. . |
| 5-131560 | 5/1993 | Japan . |

*Primary Examiner*—Jan H. Silbaugh
*Assistant Examiner*—Michael Poe
*Attorney, Agent, or Firm*—Oliff & Berridge, PLC

[57] ABSTRACT

A method of producing a tubular container which can efficiently and integrally produce a thinly walled neck section on the tubular container without altering the appearance and profile of the container. The method of producing a tubular container comprises the first step of arranging a thinly walled tube to a tube holder, the second step of softening the inside of the front end of the thinly walled tube, the third step of shrinking the front end of the thinly walled tube, and the fourth step of forming a neck section and a shoulder section to the front end of the thinly walled tube by means of a male mold. After heating the thinly walled tube with hot air, the air is drawn and removed, and the outer wall surface is cooled so as to make the subsequent steps to be conducted smoothly and efficiently. Since hot air is drawn after heating the outer wall surface, a thinly walled tapered shoulder section can be produced without altering the appearance and profile of the tubular container. Also a marble pattern can be formed on the neck section and the shoulder section at the time of molding the tubular container.

13 Claims, 14 Drawing Sheets

FIG 11
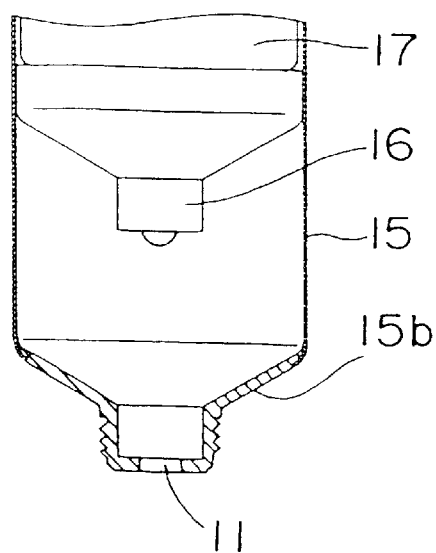
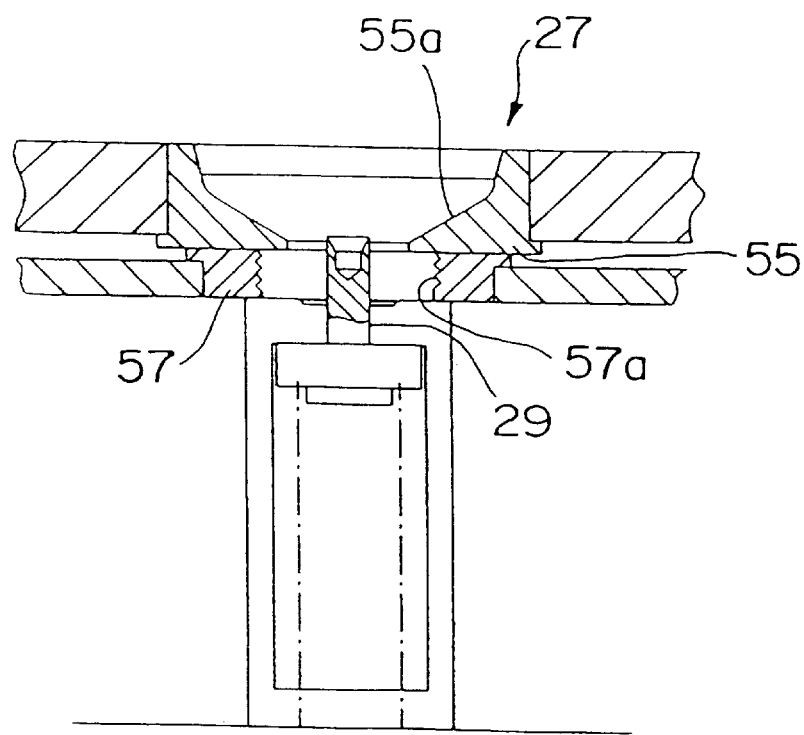

METHOD AND APPARATUS FOR PRODUCING A TUBULAR CONTAINER WHILE MAINTAINING A SHOULDER SECTION THEREOF AT A DESIRED THICKNESS, AND METHOD FOR PRODUCING A MARBLEIZED PATTERN ON A MULTI-LAYER TUBULAR CONTAINER

BACKGROUND OF THE INVENTION

1. Field of the Invention

This invention relates to a method of producing a tubular container integrally with a neck section from a thinly walled tube of thermoplastic resin. It also relates to an apparatus for producing such a container.

2. Background of the Invention

A method of producing a tubular container having a neck section from a parison by blow molding is known. However, the known method has a drawback that the shoulder section of the molded container shows a thick shoulder section because this section is stretched with a low stretch ratio. The wall thickness of the parison has to be finely regulated to overcome this drawback but the operation of such fine regulation is difficult. If the wall thickness of the parison is finely regulated, there arises an additional problem of the difficulty with which a blow nozzle can be introduced into the parison through the neck section when the neck section has a small diameter. Still additionally, there is also a problem that the parting line of the mold halves are transferred to the surface of the blow molded container when the mold is opened. When the parting line is transferred to the surface of the tubular container, it is hardly adapted to printing.

A known method of producing a tubular container proposed to overcome the above identified drawbacks comprises steps introducing a heater into a thinly walled tube and causing hot air to hit the inner wall surface of the thinly walled tube and soften the front end of the thinly walled tube, thereafter discharging hot air through the front end of the thinly walled and heated tube to the outside to make the front end show a conical profile and then forming a neck section by applying a compression molding means from the inside of the thinly walled tube.

However, with this known method, the thinly walled and heated tube is outwardly expanded to deform its appearance when hot air is discharged from the inside of the tube because no measures are taken to prevent such deformation of the thinly walled tube and hot air is made to flow toward the inner wall surface of the tube and away from the neck forming section.

With this known technique, therefore, the producing efficiency is reduced particularly when the thinly walled tube is externally heat treated to gather resin to the front end of the thinly walled tube in order to produce a neck section there because the front end of the thinly walled tube can be introduced into an external heater only with difficulty. Additionally, unnecessary portions of the thinly walled tube can be heated and deformed because the area of the outer wall surface of the thinly walled tube to which hot air is discharged is not accurately defined. The net result will be a tubular container having a disproportionately thick shoulder section due to the large volume of softened resin gathered to produce the neck section or a deformed container having poor commercial value. Another problem is that the neck section cannot be produced after the surface of the tubular container is subjected to a printing process if the thinly walled tube has been deformed.

SUMMARY OF THE INVENTION

In view of the above identified problems of the prior art, it is therefore an object of the present invention to provide a method of producing a tubular container to show a desired tubular profile with an enhanced efficiency. Another object of the invention is to provide an apparatus for producing such a tubular container.

When decorating the shoulder section of a tubular container with a marble pattern according to a prior art process, the marble pattern is typically formed on the shoulder section by printing after producing the tubular container. According to the invention, to the contrary, a marble pattern can be formed on the shoulder section of the tubular container during the manufacture of the container.

(1) According to the invention, a method of producing a tubular container having a neck section for receiving a cap from a thinly walled tube of thermoplastic resin comprises the four steps as follows.

In the first step, the thinly walled tube is arranged on a tube holder which has a head forming section for forming the neck section. A front end of the thinly walled tube is arranged to project by a given distance from the front end of the tube holder.

In the second step, an inside of the front end of the thinly walled tube is softened while maintaining the profile of the front end of the thinly walled tube by establishing a temperature difference between the inside and the outside of the thinly walled tube. Hot air is discharged onto the inner wall surface of the front end of the thinly walled tube. The discharged air is forcibly drawn in the direction moving away from a male mold. At the same time the outer wall surface of the front end of the thinly walled tube is cooled.

In the third step, the front end of the thinly walled tube is shrunk by discharging hot air onto the outer wall surface of the front end of the thinly walled tube and forcibly drawing the hot air in the direction moving away from the male mold.

In the fourth step, a neck section and a shoulder section are formed from the front end of the shrunk thinly walled tube by means of a female mold and the male mold.

Because the hot air used to heat the inner wall surface of the thinly walled tube is forcibly drawn and removed, no undesired area of the inner wall surface is heated. Also, because the outer wall surface of the thinly walled tube is cooled simultaneously and any possible deformation due to expansion is prevented, the profile of the thinly walled tube can be kept unchanged before and after the heating. Additionally, since the hot air used to heat the outer wall surface of the thinly walled tube is forcibly drawn and removed, no undesired area of the outer wall surface is heated. Thus, the volume of the portion to be softened to produce the neck section can be held to a given level and the shoulder section can be made to have a desired thickness so that consequently a tubular container having a desired profile can be obtained.

(2) An outlet for pouring out the content may be produced in the neck section at the time when the neck section and the shoulder section are formed by compression molding or a closed neck section may be formed by compression molding and an outlet may be formed after molding the neck section.

(3) The thinly walled tube may be a multilayer tube or a monolayer tube.

(4) The thinly walled tube may be a three-layer tube having an intermediary layer sandwiched by an outer layer and an inner layer and the intermediary layer may be made of a material different from those of the outer and inner layers, the inner layer having a thickness greater than the outer layer.

By making the inner layer thicker than the outer layer, the production of defectively molded tubular containers can be prevented when the neck section is formed by compression molding.

(5) The thinly walled tube may be a three-layer tube having an intermediary layer sandwiched by an outer layer and an inner layer and the intermediary layer may be made of a material different from those of the outer and inner layers, the material of the inner layer having a fluidity greater than the material of the outer layer.

By making the material of the inner layer show a fluidity different from the material of the outer layer, the former having fluidity greater than the latter, any unevenness in the linearity of the junction of the different resin materials can be prevented from occurring.

(6) The thinly walled tube may be a three-layer tube having an intermediary layer sandwiched by an outer layer and an inner layer and the intermediary layer may be made of a material different from those of the outer and inner layers, the inner layer having a thickness greater than the outer layer, the material of the inner layer having a fluidity greater than the material of said outer layer.

By making the inner layer thicker than the outer layer, the production of defectively molded tubular containers can be prevented when the neck section is formed by compression molding. By making the material of the inner layer show a fluidity different from the material of the outer layer, the former having fluidity greater than the latter, any unevenness in the linearity of the junction of the different resin materials can be prevented from occurring.

(7) According to the invention, an apparatus for producing a tubular container having a neck section for receiving a cap from a thinly walled tube of thermoplastic resin comprises a tube holder, an internal heater, an external heater and a female mold.

The tube holder holds a thinly walled tube, and includes a male mold for compression molding. The male mold is inserted into the thinly walled tube. The male mold is arranged inwardly in an axial direction from the front end of the thinly walled tube by a given distance. The tube holder is axially movable.

The internal heater discharges hot air onto the inner wall surface of the front end of said thinly walled tube. Also, the internal heater cools the outer wall surface of the front end of the thinly walled tube. The internal heater also draws the hot air axially in the direction moving away from the thinly walled tube after the inner wall is heated.

The external heater discharges hot air onto the outer wall surface of the front end of said thinly walled tube. Also, the external heater draws the hot air axially in the direction moving away from the thinly walled tube after the outer wall surface is heated.

The female mold cooperates with the male mold of said tube holder to pinch the front end of the thinly walled tube and form the neck section and the shoulder section by compression molding.

The above described producing method can be practiced easily by using an apparatus for producing a tubular container according to the invention.

(8) An apparatus for producing a tubular container according to the invention may be provided with a piercing device for forming an outlet through the neck section when producing a neck section and a shoulder section by means of the male mold and the female mold of the tube holder.

(9) The internal heater of an apparatus for producing a tubular container according to the invention may comprise an annular cooling section for cooling the outer wall surface of the front end of the thinly walled tube, a heating section arranged inside the cooling section with an annular gap provided between itself and the cooling section and a hot air suction path communicating with the annular gap so that the front end of the thinly walled tube held by the tube holder can be inserted into the annular gap between the cooling section and the heating section, the heating section being provided in the inside with a hot air path and a hot air discharge port at a position facing the cooling section with the thinly walled tube disposed therebetween.

(10) The external heater of an apparatus for producing a tubular container according to the invention may comprise an annular heating section provided in the inside with a hot air path so that the front end of the thinly walled tube held by the tube holder can be inserted into the inside of the heating section, a suction path being connected to the inside of the heating said heating section, the heating section being provided with a hot air discharge port on the inner wall surface facing the front end of the inserted thinly walled tube.

(11) A thinly walled tube to be used for the purpose of the invention may be, not limitatively, made of adhesive polyethylene and resin having gas barrier properties such as ethylene vinylalcohol copolymer.

(12) According to the invention, a method of producing a tubular container having a neck section for receiving a cap from a thinly walled multilayer tube made of thermoplastic resin and having a elliptic cross section and forming a marble pattern on the tubular container comprises:

the first step of putting the thinly walled tube on a tube holder having a neck forming section for forming the neck section and causing the front end of the thinly walled tube to project by a given distance from the front end of the tube holder;

the second step of softening the inside of the front end of the thinly walled tube, maintaining the profile of the front end of the thinly walled tube, by discharging hot air onto the inner wall surface of the front end of the thinly walled tube and forcibly drawing the discharged air in the direction moving away from said male mold, while cooling the outer wall surface of the front end of the thinly walled tube to establish a temperature difference between the inside and the outside of the thinly walled tube;

the third step of shrinking the front end of the thinly walled tube to adhere by discharging hot air onto the outer wall surface of the front end of the thinly walled tube in the direction moving away from the male mold; and the fourth step of forming a neck section and a shoulder section from the front end of the shrunk and adhered thinly walled tube by means of a female mold cooperating with the male mold.

The layers of the multilayer tube are preferably and respectively colored with desired colors.

With a method of producing a marble pattern on a tubular container according to the invention as described above, the front end of the thinly walled tube is shrunk and folded to the inside in the third step. Since the neck section and the tube holder are formed from the front end by compression molding under this condition in the fourth step, the folded portion shows phase difference, overlapping and displacement between the inner and outer layers to consequently stretch the outer layer and make it thin. In the area where the outer layer is made thin, the intermediary later and the inner layer can be seen through the outer layer to produce a marble pattern along the generatrix.

BRIEF DESCRIPTION OF THE DRAWINGS

FIG. 11 is a cross sectional view of the male mold after molding the neck section in the fourth step of the first embodiment of the invention.

DETAILED DESCRIPTION OF PREFERRED EMBODIMENTS

Figure 1:
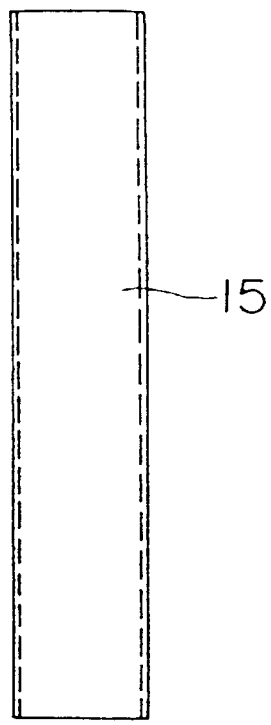
FIG. 1 is a front view of a thinly walled tube that can be used for a first embodiment of the invention.

Now, the present invention will be described by referring to FIGS. 1 through 13 illustrating the first embodiment of the invention.

Firstly, a tubular container manufactured by the method of the invention will be described by referring to FIG. 12. A tubular container 1 includes a barrel section 3 and neck section 5. The barrel section is formed by thermal molding a cylindrical, soft and thinly walled tube resin. The neck section is formed by compression molding the resin. The barrel section 3 comprises a straight barrel section 7 and a tapered shoulder section 9. The neck section 5 has an outlet 11 at an end thereof for pouring a content (not shown) therethrough and is provided with a screw thread 13 on an outer wall surface for engagedly receiving a cap.

The tubular container 1 is formed by one-piece molding thinly walled tube 15. As shown in FIG. 1, the thinly walled tube 15 is a cylindrical piece with a given length, and formed by heating adhesive polyethylene and a resin having gas barrier properties such as ethylene vinylalcohol copolymer, stretching the heated material, extrusion molding it, and cutting in the given length.

Figure 13:
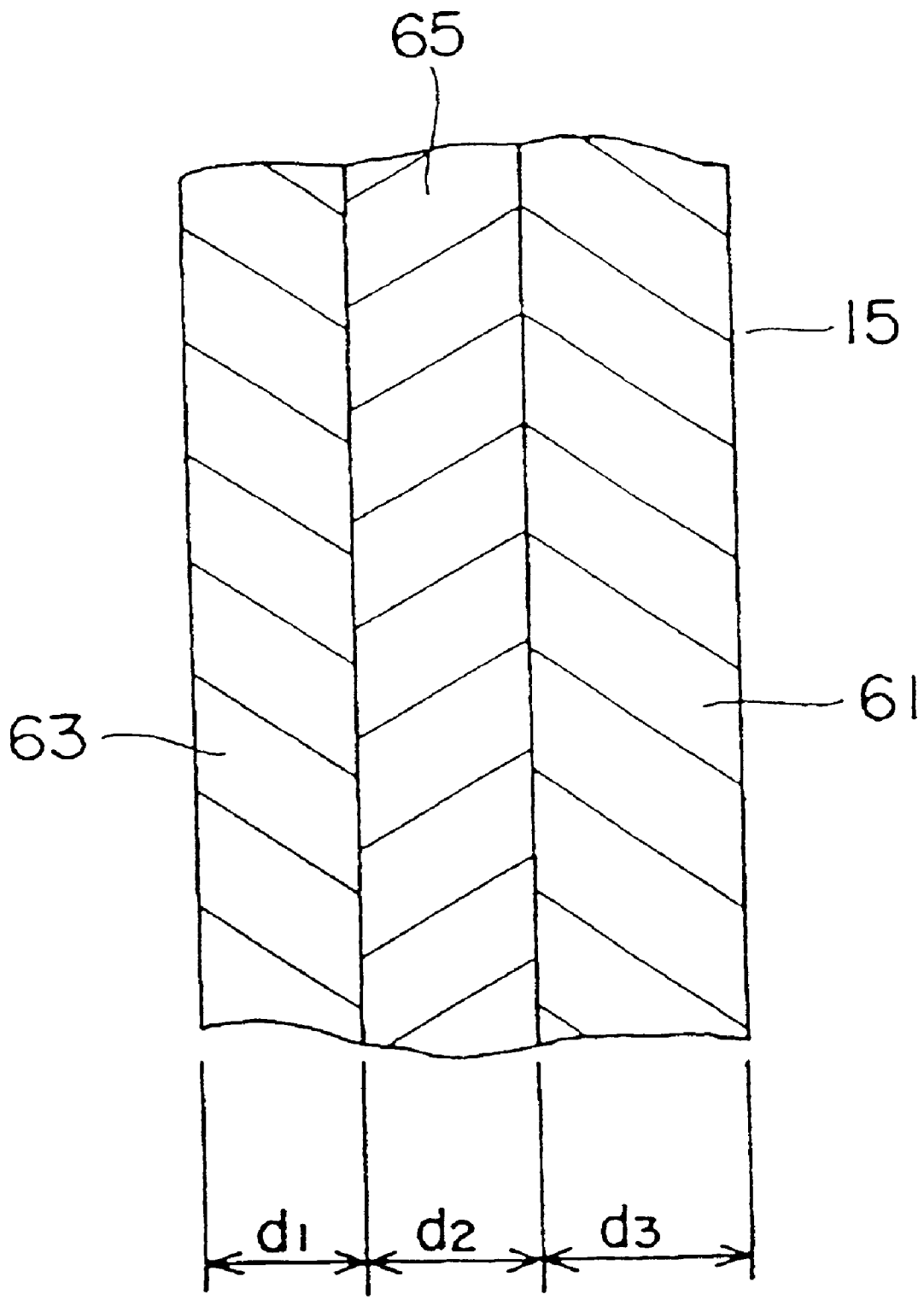
FIG. 13 is a longitudinal cross sectional view of a thinly walled tube that can be used for the first or second embodiment of the invention.

The thinly walled tube 15 may be a monolayer tube or a multilayer tube. For example, as shown in FIG. 13, the thinly walled tube 15 may have a three-layer structure comprising an outer layer 61, an inner layer 63 and an intermediary layer 65 sandwiched by the outer and inner layers. However, the present invention is not limited to the three-layer structure.

The outer layer 61 may be made of any known resin material adapted to producing tubular containers. Materials that can be used for the outer layer include polyethylene (PE) and polypropylene (PP) which have a printability, but the present invention is not limited to these material.

The inner layer 63 and the intermediary layer 65 may be made of any known resin material having desired physical and chemical properties. If gas barrier properties is expected, either the inner layer 63 or the intermediary layer 65 may be made of a resin material having gas barrier properties. Resin materials having gas barrier properties include ethylene vinylalcohol copolymer (EVOH), polyethylene terephthalate (PET), PET-G (a polyethylene terephthalate type thermoplastic copolyester where glycol is partly substituted by 1,4-cyclohexane diinethanol) and polybutylene terephthalate (PBT). If the container is to be filled with liquid containing vitamin or a coloring agent, the inner layer 63 may suitably be made of an unadsorptive resin material. A typical unadsorptive resin material is unadsorptive PET.

Each of the outer layer 61, the inner layer 63 and the intermediary layer 65 may be made of an adhesive resin material to eliminate the use of adhesive agent. Adhesive resin materials include adhesive polyethylene such as ADMER (tradename: available from Mitsui Petrochemical Industries) and MODIC (tradename: available from Mitsubishi Chemical Industries), although other materials may also be used. If adhesive resin is not used, known adhesive agents may be used.

Thus, the present invention includes not only a tubular container having a two-layer structure of adhesive polyethylene and EVOH, but also a tubular container having a three-layer structure of non-adhesive polyethylene, adhesive agent and EVOH. Also, the present invention includes a tubular container having a five-layer structure of polyethylene, adhesive agent, EVOH, adhesive agent and polyethylene.

The thinly walled tube 15 may show a circular or elliptic cross sectional view.

Now, a first embodiment of apparatus for producing a tubular container by means of the method of the present invention will be described by referring to FIGS. 2, 4. 6 and 9.

The producing apparatus comprises a tube holder 17, an internal heater 23, an external heater 25, a female mold 27 and a piercing device 29.

Figure 3:
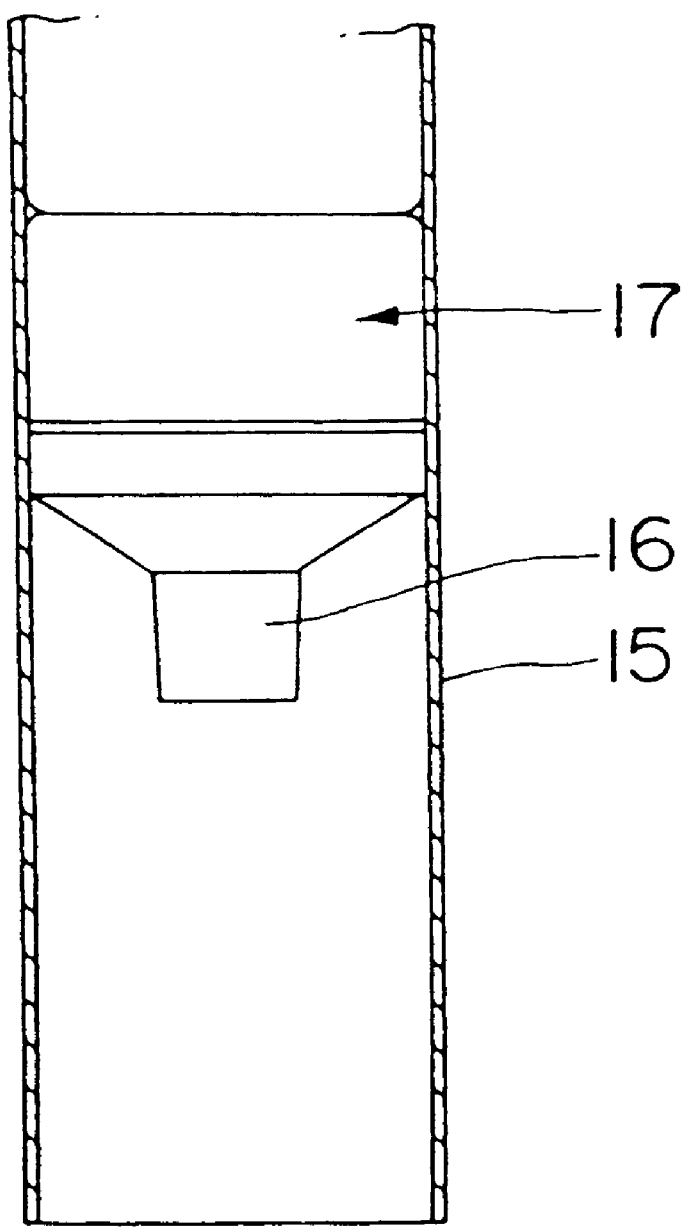
FIG. 3 is a cross sectional view of the tube holder of the first embodiment of the invention and the thinly walled tube held by the tube holder.

The tube holder 17 is used to hold the thinly walled tube 15 and to form the neck section 5 and the tapered shoulder section 9 by compression molding. The tube holder includes a tube holder main body 31 and a male mold 16. The male mold 16 and the tube holder main body 31 shows a circular cross sectional view as the thinly walled tube 15. The male mold 16 is arranged at the front end of the tube holder main body 31 and movably relating to the holder main body 31. As shown in FIG. 3, the thinly walled tube 15 is held by the tube holder main body 31 of the tube holder 17 with its front end projecting from the front end of the tube holder 17 by a predetermined length.

The internal heater 23 is used to heat an inner wall surface 19 of the thinly walled tube 15 and to cool an outer wall surface 21 of the thinly walled tube, so as to soften the inner wall surface 19 while producing a temperature difference between the inside and the outside of the thinly walled tube 15. As shown in FIG. 4, the internal heater 23 has an annular cooling section 33 for cooling the outer wall surface 21 of the front end 15a of the thinly walled tube 15, a heating section 37 arranged inside the cooling section 33 with an annular gap 35 provided therbetween and a hot air suction path 39 communicating with the annular gap 35.

The cooling section 33 includes a circulating section 41 for constantly circulating a coolant such as water therethrough and a cooling surface 43 for cooling the outer wall surface 21 of the thinly walled tube 15 so that the outer wall surface 21 of the thinly walled tube 15 is cooled as the cooling surface 43 is held in contact with the outer wall surface 21 of the thinly walled tube 15.

The heating section 37 is realized in the form of a hollow cylinder communicating with a heat generator (not shown) and closed at the top. The heating section 37 has a small diameter section 37a at an upper portion thereof so that it may be inserted into the front end 15a of the thinly walled tube 15. The lower portion of the heating section 37 is a large diameter section 37b that communicates with the small diameter section 37a. At an upper portion of the small diameter section 37a, there is provided a hot air discharge port 45 facing to the cooling section 33. The thinly walled tube 15 can be disposed between the hot air discharge port and the cooling section.

The hot air suction path 39 communicating with the gap 35 is also communicating with a hot air suction means (not shown) to draw hot air away from the front end 15a of the thinly walled tube 15.

Figure 6:
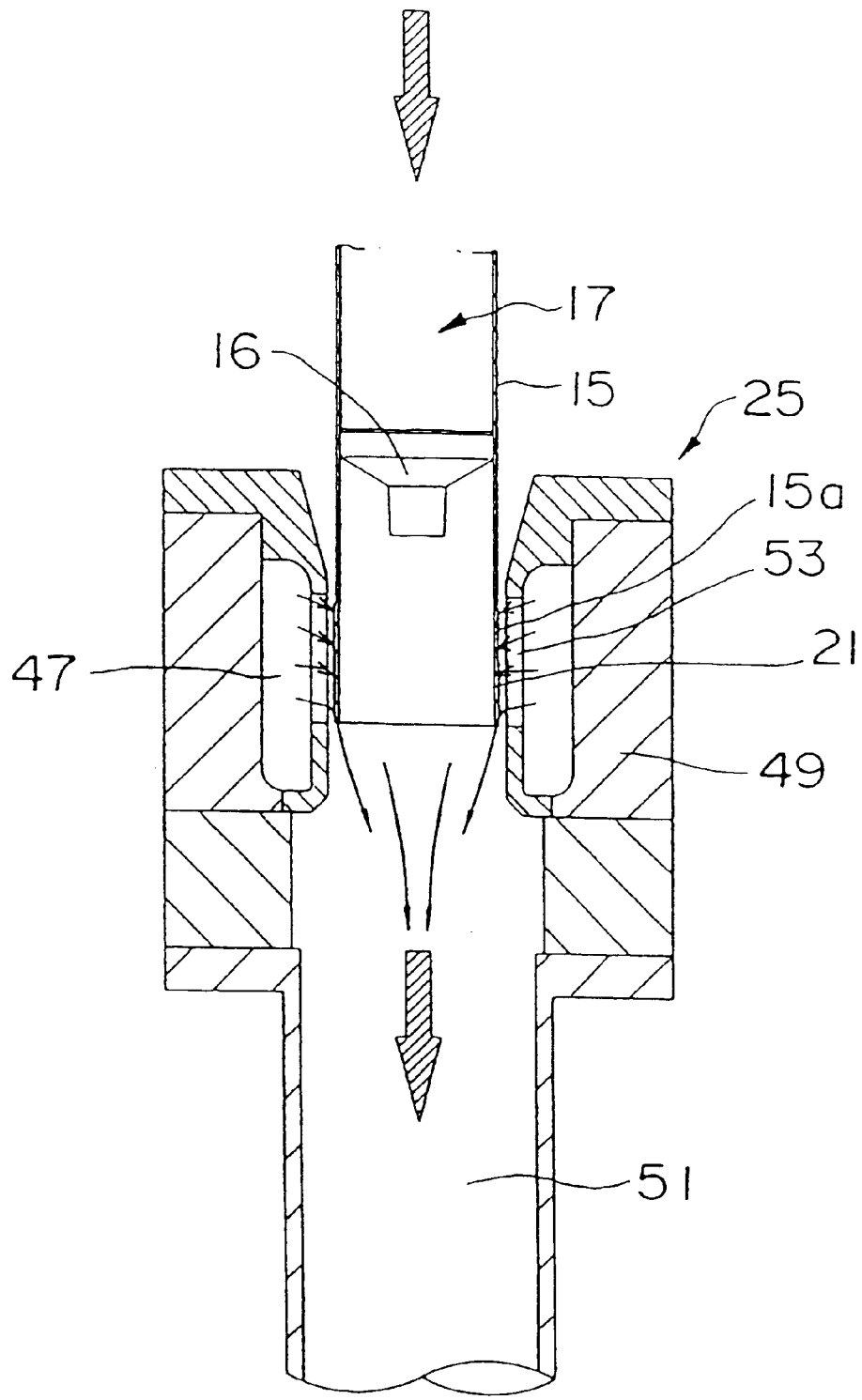
FIG. 6 is a cross sectional view of the external heater of the first embodiment of the invention.

The external heater 25 is designed to heat the outer wall surface 21 of the front end 15a of the thinly walled tube 15. As shown in FIG. 6, the external heater has an annular heating section 49 which contains a hot air flow path 47. The front end 15a of the thinly walled tube 15 held by the tube holder 17 can be inserted into the heating section 49. An inside of the heating section 49 communicates with a hot air suction path 51. A hot air discharge port 53 is arranged in the heating section at a position where the inserted front end 15a of the thinly walled tube 15 faces to.

Figure 9:
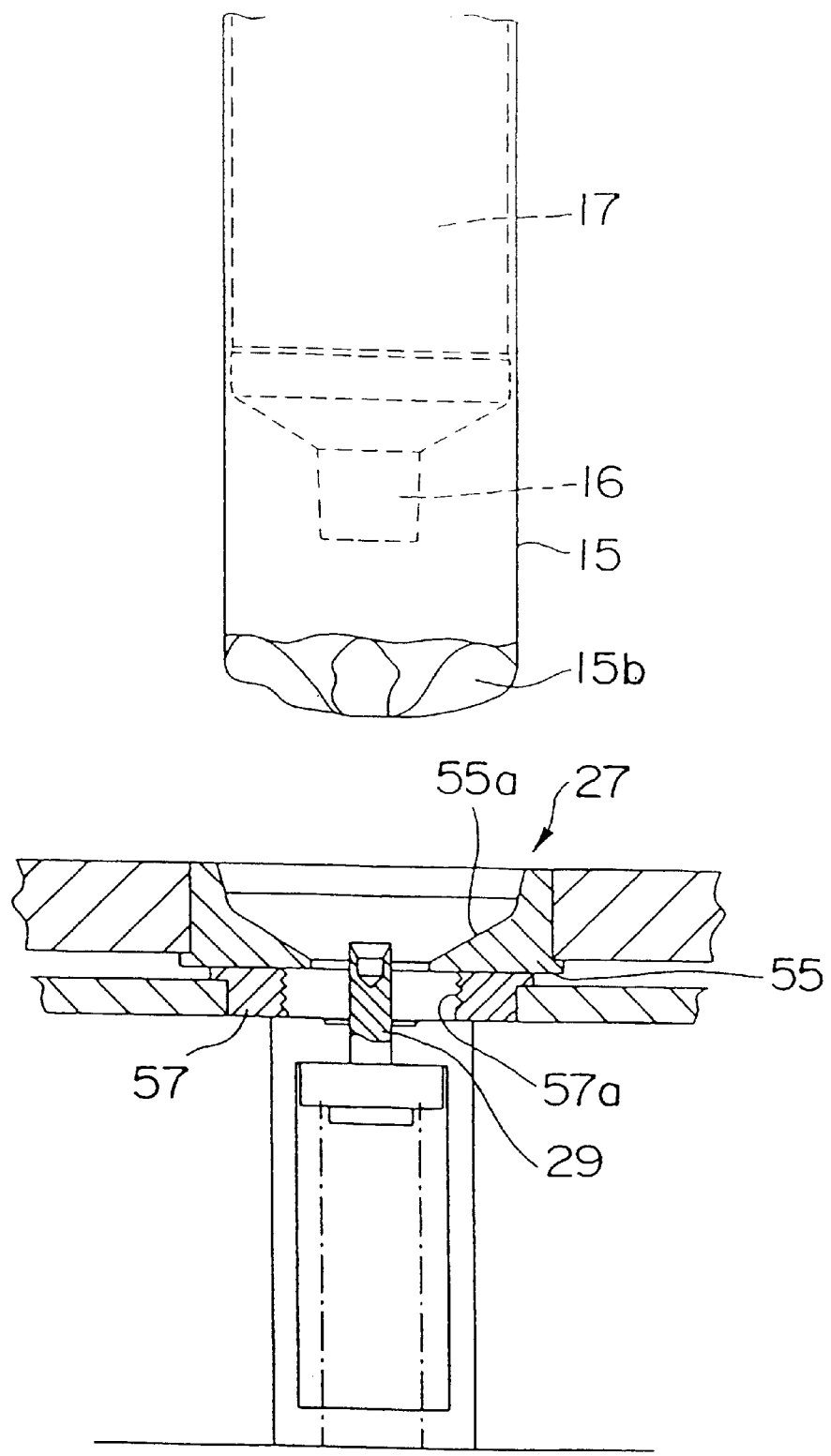
FIG. 9 is a cross sectional view of the male mold before molding the neck section in the fourth step of the first embodiment of the invention.

As shown in FIG. 9, the female mold 27 includes a first metal mold 55 and a second metal mold 57. The first metal mold 55 has a cavity 55a with a profile corresponding to the external contour of the tapered shoulder section 9 of the tubular container 1. The second metal mold is arranged under the first metal mold 55 and has a cavity 57a with a profile corresponding to the external contour of the neck section 5. The piercing device 29 for forming the outlet 11 in the neck section 5 is arranged below the second metal mold 57. The piercing device 29 is urged upwardly in FIG. 9 by a resilient means such as a spring. When the front end 15b of the thinly walled tube 15 is compression molded by the male mold 16 and the female mold 27, the piercing device forms the outlet 11 in the neck section 5.

Now, the method of producing a tubular container according to the invention will be described by referring to FIGS. 1 through 11.

Figure 2:
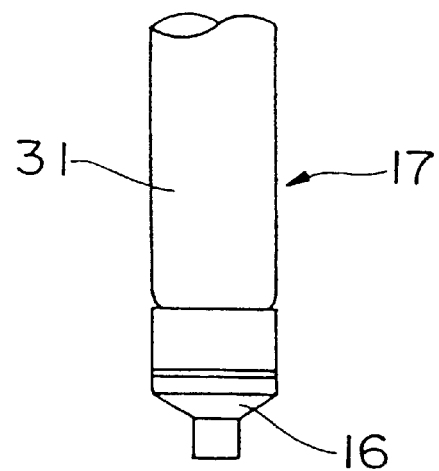
FIG. 2 is a front view of the tube holder used in the first step of the first embodiment of the invention.

FIGS. 1 through 3 illustrate the first step of arranging a piece of material resin for the tubular container 1 in position.

As shown in FIG. 3, the thinly walled tube 15 for producing a tubular container 1 is arranged around the tube holder 17. The front end of the thinly walled tube projects axially and outwardly from the front end of the male mold 16 by a given distance. Even if the thinly walled tube 15 is arranged around the tube holder 17, the male mold 16 can be axially moved within the tube holder 17.

Figure 4:
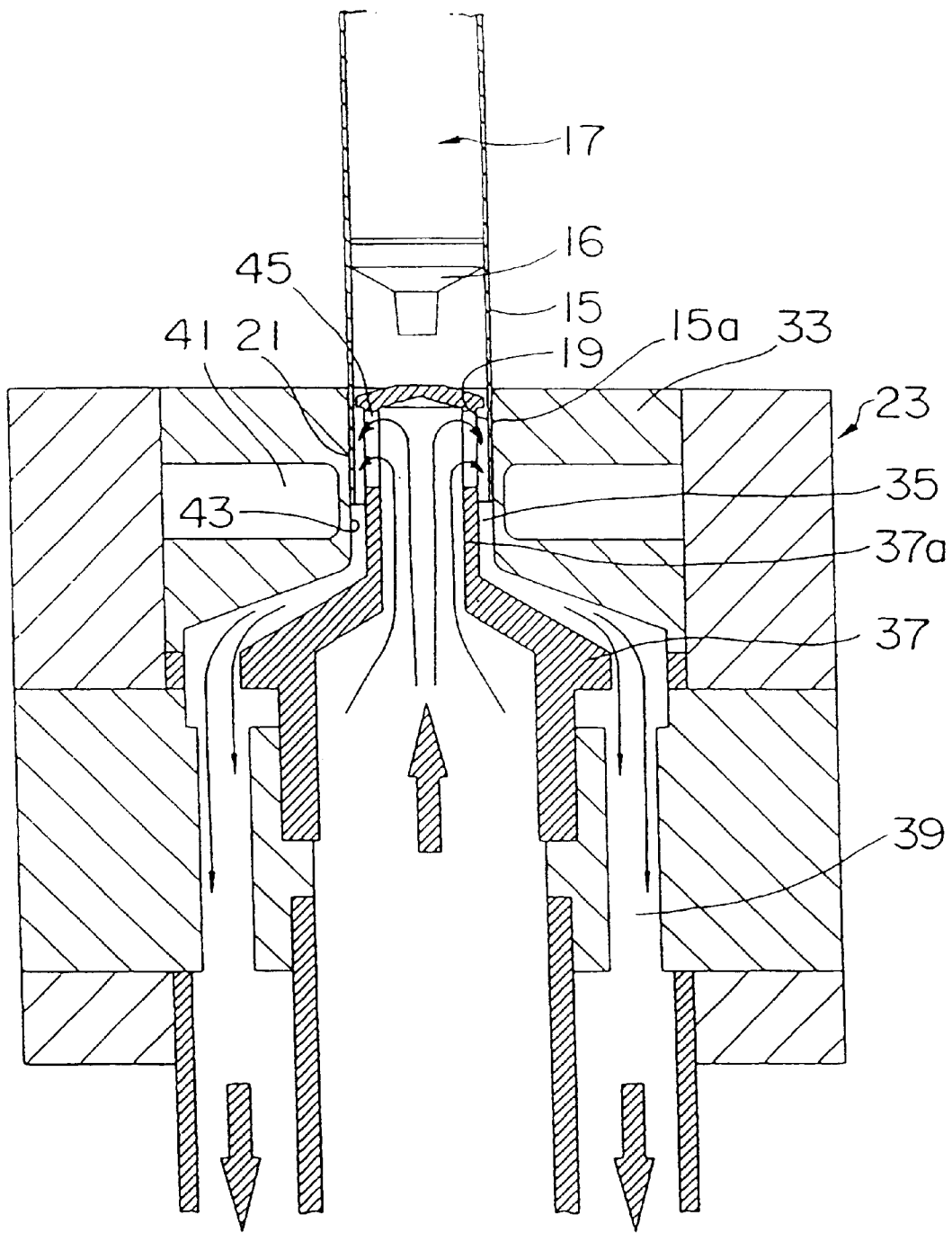
FIG. 4 is a cross sectional view of the internal heater of the first embodiment of the invention.
Figure 5:
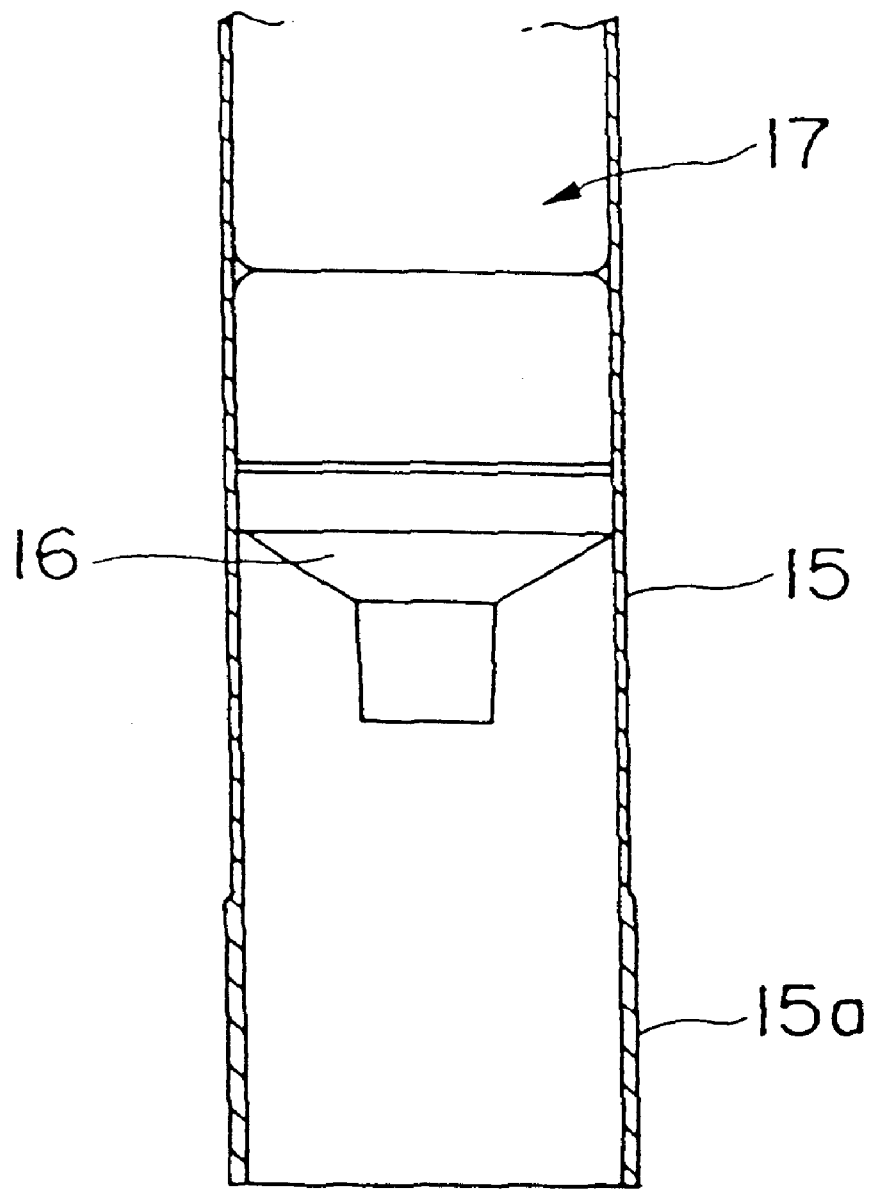
FIG. 5 is a cross sectional view of the tube holder and the thinly walled tube held by the tube holder after the heat treatment of the second step of the first embodiment of the invention.

FIGS. 4 and 5 illustrate the second step of softening the inner wall surface 19 of the thinly walled tube 15.

The tube holder 17 carrying the thinly walled tube 15 on the outer peripheral surface thereof is moved until the front end 15a of the thinly walled tube 15 is introduced into the gap 35 between the cooling surface 43 of the internal heater 23 and the small diameter section 37a of the heating section 37. Then, the inner wall surface 19 of the thinly walled tube 15 is heated by the heating section 37 while the outer wall surface 21 is cooled by the cooling surface 43. The heating is conducted by flowing hot air in the heating section 37 and discharging it through the hot air discharge port 45 along the direction indicated by the arrows in FIG. 4, so as to soften the inner wall surface 19. The hot air applied to the inner wall surface 19 is forcibly drawn downwardly in FIG. 4 through the hot air suction path 39 by a suction means (not shown). Thus, the areas of the thinly walled tube 15 that should not be heated is minimally affected by the heating.

The hot air temperature and the duration of time of the heating are so selected as to sufficiently soften the inner wall surface 19 of the thinly walled tube 15. While specific values are cited for the hot air temperature in the examples described hereinafter, it is not limited to those values by any means. The duration of time of the heating is also not limited to the examples. It should be noted, however, that the resin material of the thinly walled tube would become molten if the hot air temperate is too high. Therefore, it is preferable to control the heating by controlling the duration of time.

The cooling is conducted by constantly circulating a coolant such as water in the circulating section 41 to absorb heat from the outer wall surface 21 of the thinly walled tube 15 that is held in contact with the cooling surface 43. Because the outer wall surface 21 of the thinly walled tube 15 is cooled, the outer wall surface 21 is prevented from becoming soft, so as to maintain the profile of the front end 15a of the thinly walled tube 15.

As the inner wall surface 19 of the thinly walled tube 15 is softened, the front end 15a of the thinly walled tube 15 comes to show an increased wall thickness and a reduced length as shown in FIG. 5. This may be because the front end 15a of the thinly walled tube 15 produced by stretch and extrusion molding is heated at temperature above the glass transition temperature of the thinly walled tube 15 by the heating section 37 so that it contracts and recovers the original profile due to the memory. The contracted front end 15a of the thinly walled tube 15 provides a certain volume of resin required for forming the neck section 5 and the tapered shoulder section 9.

Figure 7:
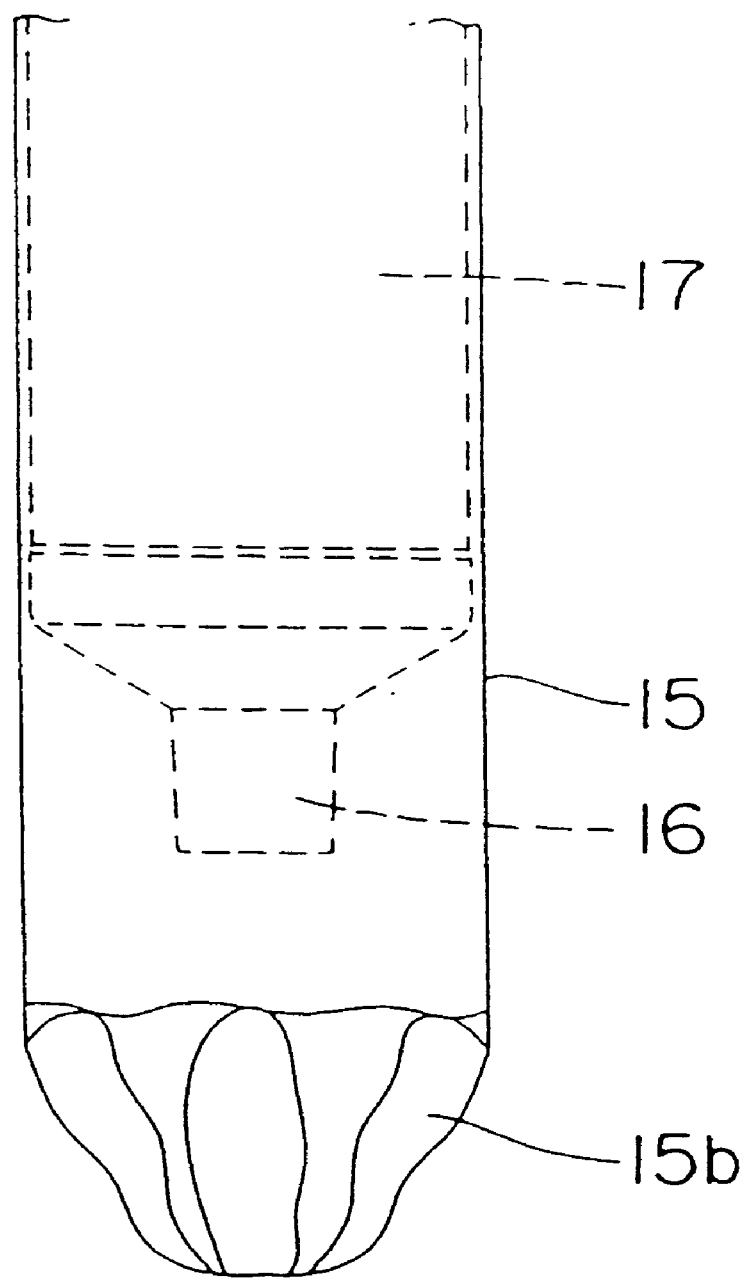
FIG. 7 is a front view of the tube holder and the thinly walled tube held by the tube holder immediately after the heat treatment of the third step of the first embodiment of the invention.
Figure 8:
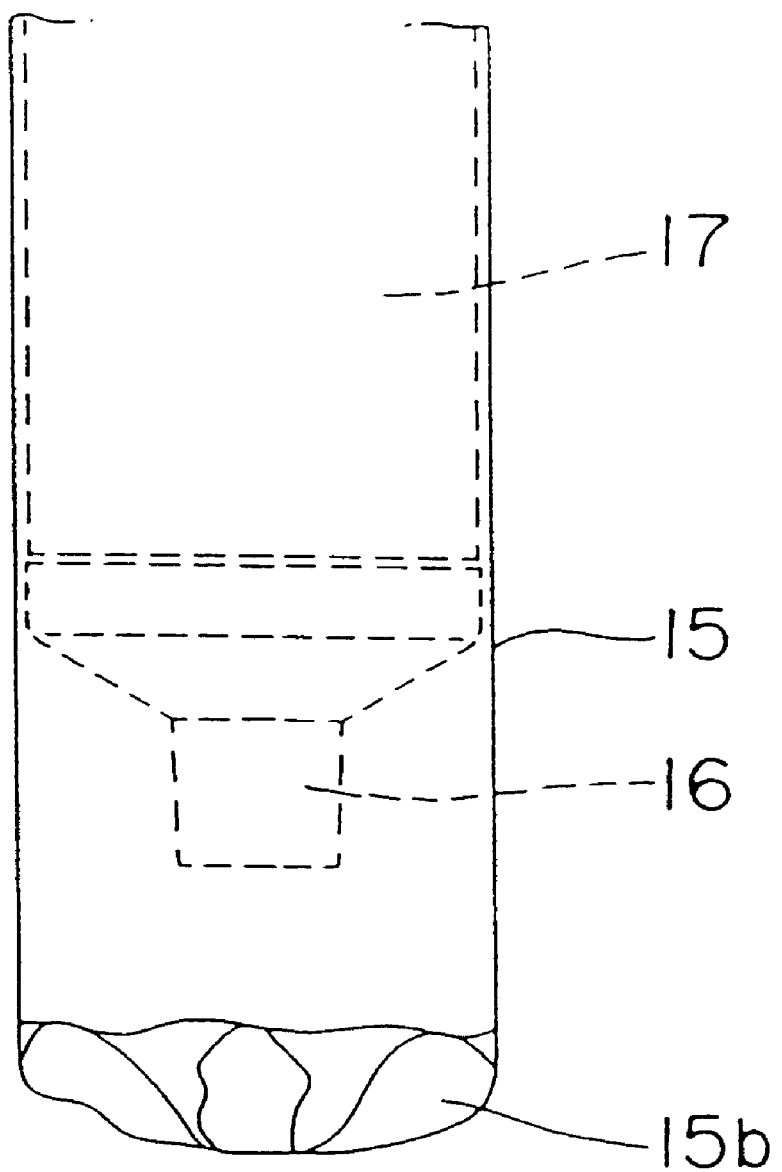
FIG. 8 is a front view of the tube holder and the thinly walled tube held by the tube holder after the heat treatment of the third step of the first embodiment of the invention.

FIGS. 6 through 8 illustrate the third step of softening the outer wall surface 21 of the front end 15a of the thinly walled tube 15.

The tube holder 17 carrying the thinly walled tube 15 whose front end 15a has been made to show a large wall thickness then moved until the front end 15a of the thinly walled tube 15 is inserted into the heating section 49 of the external heater as illustrated in FIG. B. Then, the outer wall surface 21 of the thinly walled tube 15 is heated by means of a heater 49 positioned around the outer peripheral surface of the front end 15a of the thinly walled tube 15. The outer wall surface 21 of the thinly walled tube 15 is exposed to hot air discharged from the hot air discharge port 53 to consequently heat the outer wall surface 21 of the thinly walled tube 15. After contacting with the outer wall surface 21, the hot air is drawn and removed along the hot air suction path 51 as illustrated in FIG. 6 in order to make the front end 15a of the thinly walled tube 15 to deform or shrink inwardly and, at the same time, to minimize the influence of hot air to the areas that should not be affected by heat.

The hot air temperature and the duration of time of the heating are so selected as to sufficiently soften the front end 15a of the thinly walled tube 15. While specific values are cited for the hot air temperature in the examples described hereinafter, it is not limited to those values by any means. The duration of time of the heating is also not limited to the examples. It should be noted, however, that if the hot air temperature is too high, the resin material of the thinly walled tube would become molten, and, therefore, it is preferable to control the heating by controlling the duration of time.

As the outer wall surface 21 is heated, the front end 15b of the thinly walled tube 15 is deformed toward the inside of the thinly walled tube 15 as shown in FIG. 7 and then thermally contracts as shown in FIG. 8. The contracted or shrunk portion of the thinly walled tube 15 provides a certain volume of resin required for forming the neck section 5 and the tapered shoulder section 9.

The extent of external heating depends on the volume required for forming the neck section 5 and the tapered shoulder section 9. For example, if the thinly walled tube 15 has a diameter of 19 mm, the thinly walled tube 15 is heated by a length of 15 mm from the front end, and if the thinly walled tube 15 has a diameter of 22 mm, it is heated by a length of 22 mm from the front end, although the present invention is not limited to these values.

Figure 10:
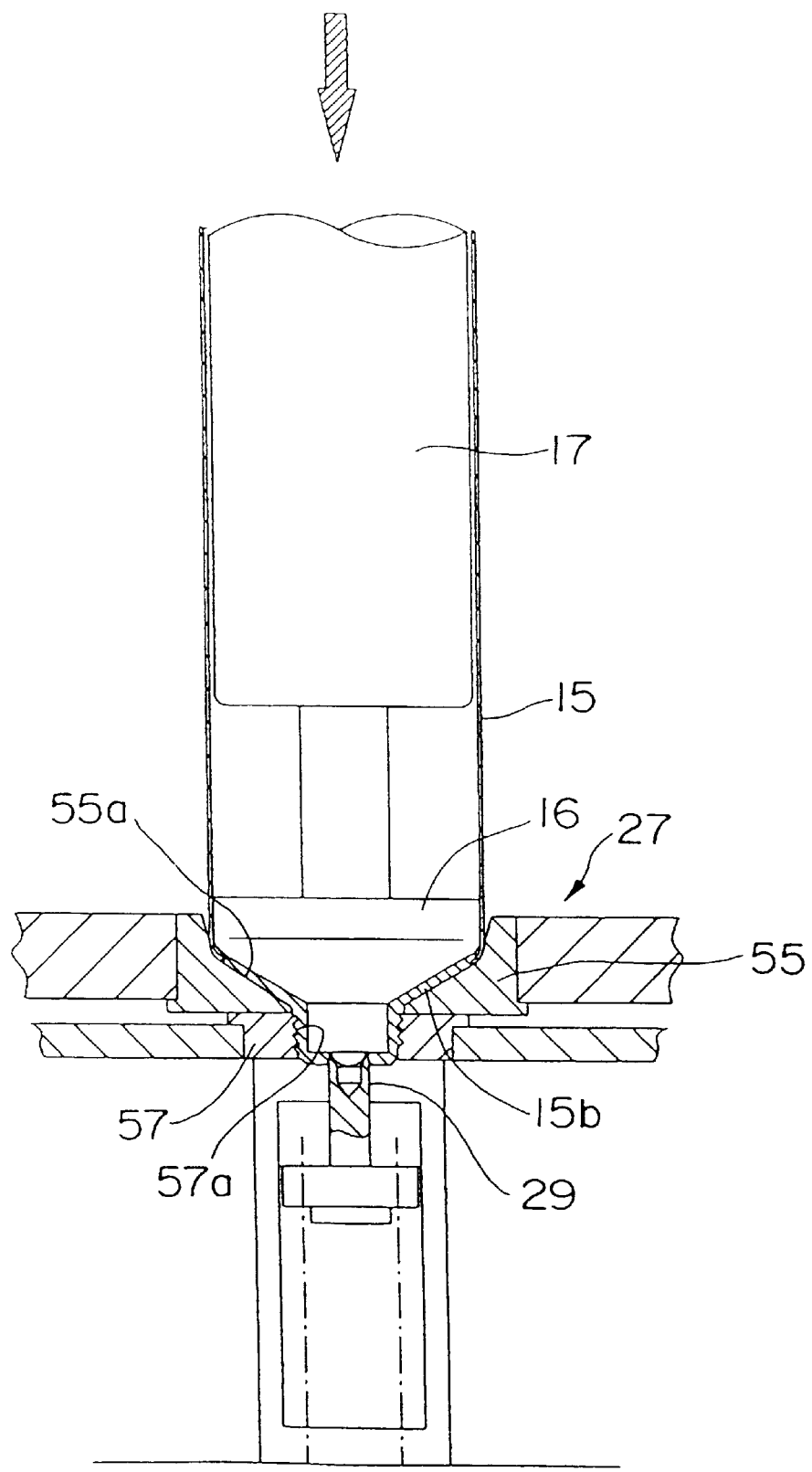
FIG. 10 is a cross sectional view of the male mold when molding the neck section in the fourth step of the first embodiment of the invention.

FIGS. 9 through 11 illustrate the fourth step of forming the neck section 5 and a tapered shoulder section 9 for the tubular container 1.

The tube holder 17 holding the thinly walled tube 15 whose front end 15b has been contracted is then moved above the female mold 27 as shown in FIGS. 9 and 10. Then, the tube holder 17 is moved downwardly until the front end 15b is placed on the female mold 27. Subsequently, the male mold 16 is moved downwardly relative to the tube holder 17. The male mold 16 and the female mold 27 hold the front end 15b of the thinly walled tube 15 therebetween and form the neck section 5 and the tapered shoulder section 9 by compression molding. At the same time, the outlet 11 is formed in the neck section 5 by means of the piercing device 29 as shown in FIG. 10.

Figure 12:
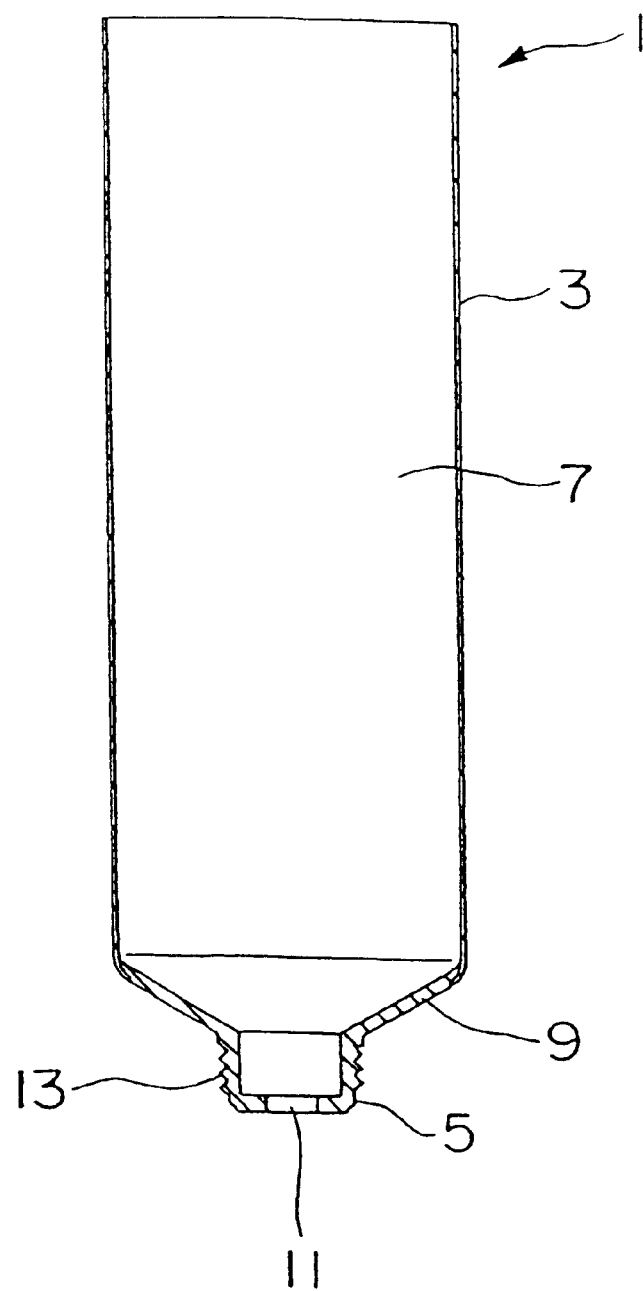
FIG. 12 is a cross sectional view of a tubular container produced by the first embodiment of the invention.

After the compression molding process is over, the tube holder 17 holding the thinly walled tube 15 is moved upward and then the thinly walled tube 15 is removed from the tube holder 17 to complete the operation of producing the tubular container 1 as shown in FIG. 12.

EXAMPLE 1

The thinly walled tube 15 was prepared from adhesive polyethylene and EVOH copolymer having gas barrier properties. The wall thickness of the thinly walled tube was 0.5 mm. The outer layer and the inner layer were made of the adhesive polyethylene, whereas the intermediary layer was made of EVOH. The thinly walled tube 15 had a diameter of 19 mm.

The internal heater 23 was used to operate in a manner as described below. Air was heated by it to 380° C., and the air pressure was 0.08 MPa (the air flow rate was 410 Nl/min). The suction force of heated air was 330 Nl/min. The heating time was 1 second.

The external heater 25 was used to operate as follows. Air was heated by it to 300° C., and the air pressure was 0.09 MPa (the air flow rate was 380 Nl/min). The suction force of heated air was 350 Nl/min. The water flow rate of the cooling section was 2.2 l/min. The heating time was 4 seconds. The thinly walled tube 15 was heated by 15 mm from the front end of the tube.

As a result, a good tubular container 1 was produced.

EXAMPLE 2 through 5

In these examples, the thinly walled tubes 15 as listed in Table 1 were used to produce respective tubular containers 1. Table 1 shows how the internal heater 23 and the external heater 25 were used for each example.

As a result, a good tubular container 1 was produced in each example.

TABLE 1

|  | Example 2 | Example 3 | Example 4 | Example 5 |
|---|---|---|---|---|
| thinly walled tube 15 | | | | |
| outer layer | adhesive polyethylene | low density polyethylene | low density polyethylene | low density polyethylene |
| inner layer | EVOH | adhesive polyethylene | adhesive polyethylene | adhesive polyethylene |
| interm. layer | adhesive polyethylene | EVOH | PBT | PET-G |
| total thick'ss | 0.5 mm | 0.5 mm | 0.5 mm | 0.5 mm |
| diameter | 25 mm | 25 mm | 25 mm | 25 mm |
| internal heater | | | | |
| air temp. | 375° C. | 375° C. | 375° C. | 375° C. |
| air flow rate | 410 (Nl/min) | 410 (Nl/min) | 410 (Nl/min) | 410 (Nl/min) |
| air suc. power | 300 (Nl/min) | 300 (Nl/min) | 300 (Nl/min) | 300 (Nl/min) |
| water flow rate | 2.2 (l/min) | 2.2 (l/min) | 2.2 (l/min) | 2.2 (l/min) |
| heating time | 1 (sec) | 2 (sec) | 0.8 (sec) | 1 (sec) |
| external heater | | | | |
| air temp. | 400° C. | 400° C. | 400° C. | 400° C. |
| air flow rate | 380 (Nl/min) | 380 (Nl/min) | 380 (Nl/min) | 380 (Nl/min) |
| air suc. power | 400 (Nl/min) | 400 (Nl/min) | 400 (Nl/min) | 400 (Nl/min) |
| water flow rate | 4 (sec) | 6 (sec) | 6 (sec) | 6 (sec) |
| heating time (from front end) | 22 (mm) | 22 (mm) | 22 (mm) | 22 (mm) |

Now, the second embodiment of the invention will be described. This second embodiment relates to a tubular container 15 comprising a three-layer structure. In this second embodiment, the thickness and the properties of each layer are discussed. The producing method and the producing apparatus for this second embodiment are same as those described above and hence will not be described any further.

The inventor of the present invention conducted a series of experiments on tubular containers by using various resin materials having different fluidity levels and by changing the thickness of each of the layers. The inventor found that the thickness and the fluidity greatly affect the rate of producing defective tubular containers. This will be described by referring to Tables 2 and 3 summarizing the results of the experiments. Note that the experiments were on the three-layer structure where the outer layer 61 and the inner layer 63 are made of same adhesive polyethylene and the intermediary layer 65 is made of EVOH.

[Table 2]

In Table 2, the fluidity is expressed in terms of melt index (hereinafter referred to as MI). The MI was a value obtained by extruding a molten thermoplastic resin material with a predetermined temperature and pressure through an orifice having a predetermined diameter and a length, weighing the extruded material, and reducing it into the number of grains per 10 minutes. The method was conducted in accordance with ASTM-D-1238. Generally, the higher the MI, the better the fluidity and workability. However, generally, the higher the MI, the less a tensile strength and a stress cracking resistance are worse.

In Table 2, the evaluation of the rate of producing good products indicates as follows.

| | |
|---|---|
| ⊚: | very low rate of producing defective products |
| ○: | low rate of producing defective products |
| ▲: | relatively high rate of producing defective products |
| X: | very high rate of producing defective products |

The term "defective product" as used herein refers to a product showing an abnormal projection on the shoulder section, a defectively thread, no outlet or a similar defect.

In Table 2, the number of specimens of each experiment was 50.

TABLE 2

| | wall thickness d($\mu$m) | | | MI | | |
|---|---|---|---|---|---|---|
| experiment No. | outer layer | interm. layer | inner layer | outer layer | inner layer | rating |
| 1 | 225 | 50 | 225 | 1.6 | 1.6 | ▲ |
| 2 | 225 | 50 | 225 | 1.5 | 1.5 | ▲ |
| 3 | 225 | 50 | 225 | 1.2 | 1.2 | X |
| 4 | 300 | 50 | 150 | 1.6 | 1.6 | X |
| 5 | 150 | 50 | 300 | 1.6 | 1.6 | ○ |
| 6 | 235 | 30 | 235 | 1.6 | 1.6 | ▲ |

From Experiments Nos. 1 through 3 in Table 2, it is seen that if the thickness d3 of the outer layer 61 and the thickness d1 of the inner layer 63 are made equal to each other and the outer layer 61 and the inner layer 63 are made of materials having a same level of fluidity, the produced tubular containers show a high rate of producing defective products From Experiments Nos. 4 and 5 in Table 2, it will be seen that if the thickness d1 of the inner layer 63 is greater than the thickness d3 of the outer layer 61, the rate of producing good products is increased.

[Table 3]

Based on the result of the experiments indicated in Table 2, further experiments were conducted. Table 3 summarizes the results obtained by modifying the values for the thickness d2 of the intermediary layer 63 and MI, provided that the thickness d1 of the inner layer 63 was greater than the thickness d3 of the outer layer 61.

In Table 3, the term "weld mark" refers to the linear flaw appearing on the junction portion of thermoplastic resin. Generally, when two or more flows of thermoplastic resin are poured into a metal mold to produce a mold product and they are perfectly fused or mingled with each other, a linear flaw appears on the junction portion so as to degrade the commercial value the product. Even if the linear flaw is not remarkable in appearance, the strength of the product perpendicular to the weld mark is significantly reduced if compared with a product having no weld mark and hence the product is more liable to give rise to stress-triggered corrosive cracking.

In Table 3, the evaluation of the weld mark indicates as follows.

| | |
|---|---|
| ○: | no remarkable linear flaw |
| ▲: | somewhat remarkable linear flaw |
| X: | remarkable linear flaw |

The evaluation of the rate of producing good products is same as that in Table 2. In Table 3, the number of specimens of each experiment was 100.

TABLE 3

| | wall thickness d ($\mu$m) | | | MI | | | weld |
|---|---|---|---|---|---|---|---|
| experiment No. | outer layer | interm. layer | inner layer | outer layer | inner layer | rating | mark rating |
| 1 | 210 | 10 | 280 | 1.6 | 1.6 | ⊚ | X |
| 2 | 200 | 30 | 270 | 1.6 | 1.6 | ⊚ | ○ |
| 3 | 210 | 10 | 280 | 1.5 | 1.5 | ⊚ | ○ |
| 4 | 200 | 30 | 270 | 1.5 | 1.5 | ⊚ | ▲ |
| 5 | 200 | 50 | 250 | 1.5 | 1.5 | ○ | X |
| 6 | 210 | 10 | 280 | 1.5 | 1.6 | ⊚ | ○ |
| 7 | 200 | 30 | 270 | 1.5 | 1.6 | ⊚ | ○ |
| 8 | 200 | 50 | 250 | 1.5 | 1.6 | ⊚ | X |

From the results of Experiments No. 1 and 6 of Table 3, it is seen that the high rate of producing good products can be realized or obtained by making the thickness d1 of the inner layer 63 greater than the thickness d3 of the outer layer 61, and that the tubular container 1 in which the weld mark is not remarkable in appearance can be obtained by selecting a greater value of MI of the resin material of the inner layer 63 than a value of MI of the resin material of the outer layer 61.

The results of Experiments Nos. 3–5 or Nos. 6–8 of Table 3 show that tubular containers 1 showing a remarkable weld mark are increased when the thickness d2 of the intermediary layer 65 is large.

In only the Experiments Nos. 5 and 8. the defect that the outlet 11 was not formed on the neck section 5 (hereinafter referred to as closed outlet) was found. From this fact and the results of Experiments Nos. 3–5 and Nos. 6–8, it is seen that a closed outlet is liable to occur when the thickness d2 of the intermediary layer 65 is large.

In view of the above description, when a three-layer thinly walled tube 15 is used, it is preferable to meet the following requirements.

(1) The thickness d1 of the inner layer 63 is greater than the thickness d3 of the outer layer 61.

(2) MI of the inner layer 63 is greater than that of the outer layer 61.

Figure 14:
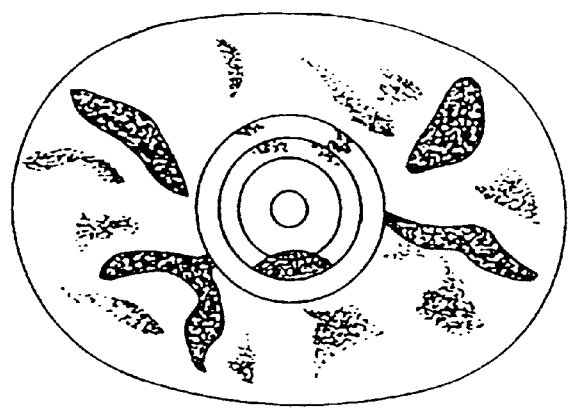
FIG. 14 is a cross sectional view of a tubular container produced by the third embodiment of the invention.
Figure 15:
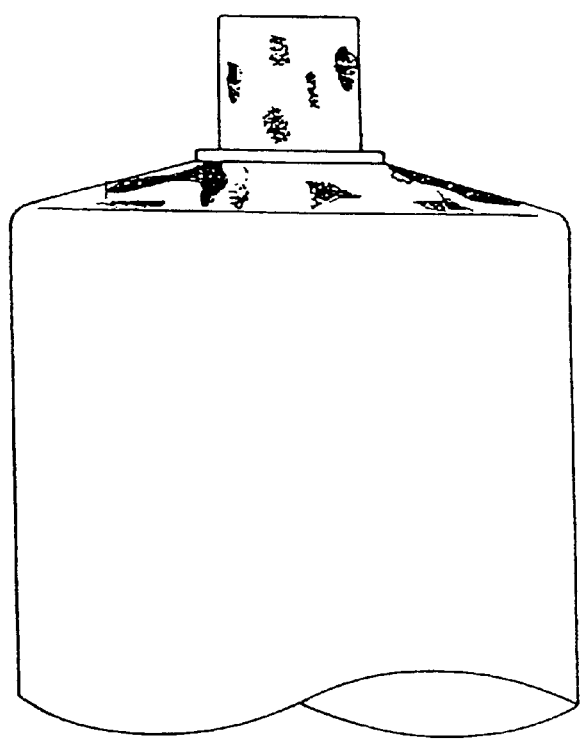
FIG. 15 is a partial front view of the shoulder section and the neck section of a tubular container produced by the third embodiment of the invention.

According to the third aspect of the invention, the tubular container 1 can be provided with a marble pattern on the shoulder section. According to the present invention, the marble pattern as shown in FIGS. 14 and 15 may be applied when the shoulder section and the neck section are formed on the tubular container 1.

For producing a marble pattern on the shoulder section of the tubular container 1, the thinly walled multilayer tube 15 is used and the layers of the tube are respectively colored with desired colors. For example, for producing a pink marble pattern on a white container, the outer layer is colored to white, whereas the intermediary layer and/or the inner layer are colored to pink. Any appropriate known coloring agents may be used for coloring. The thinly walled tube shows an elliptic cross section.

The above described producing method and producing apparatus can be used for producing the tubular container 1 carrying the marble pattern on the shoulder section and on the neck section. Therefore, the description of the first and second producing steps will be omitted here.

Figure 16:
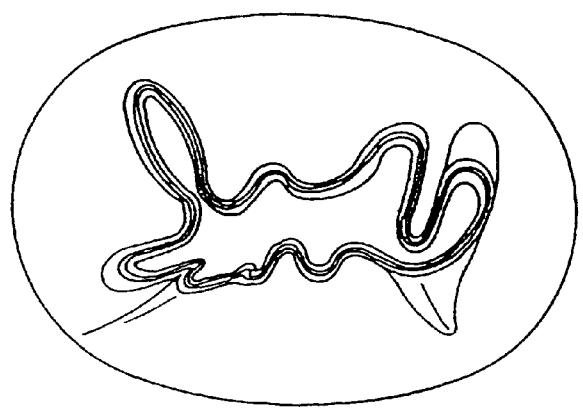
FIG. 16 is a cross sectional partial view take along line A—A of FIG. 17.
Figure 17:
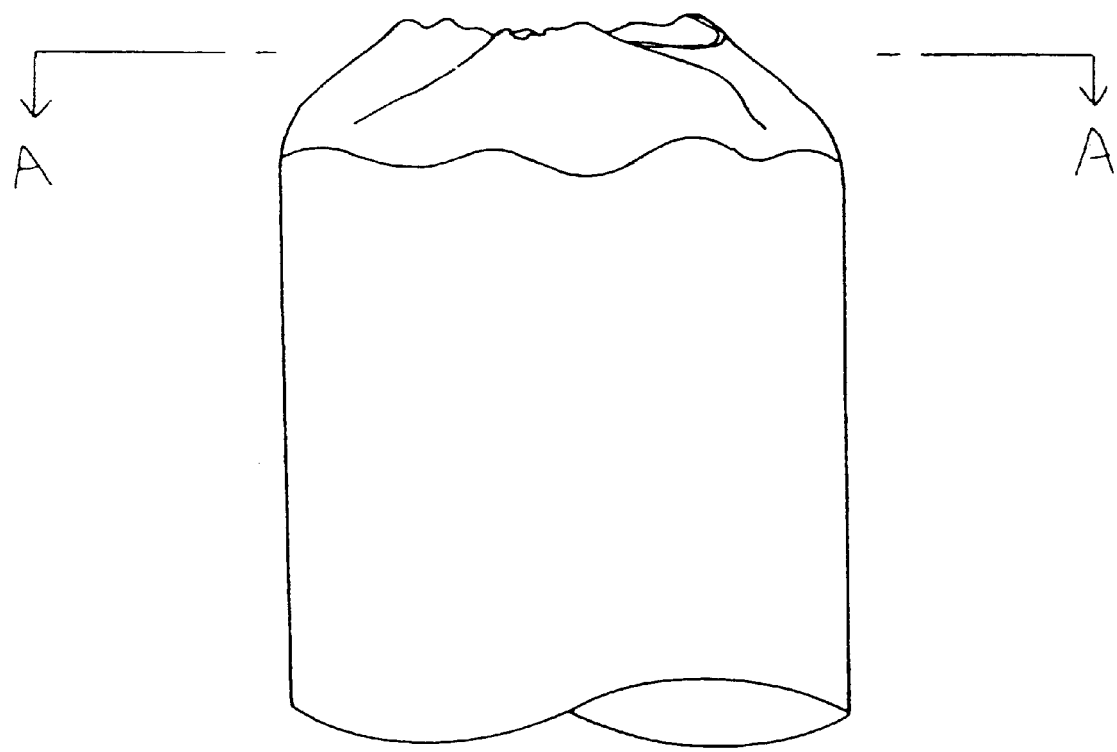
FIG. 17 is a partial front view of the thinly walled tube held by the tube holder after the heat treatment of the third step of the third embodiment of the invention.

Referring to the third step of the method of producing the above described tubular container 1, the outer wall surface 21 of the thinly walled tube 15 is heated by the heater 49, the hot air contacts with or hits to the outer wall surface 21, and the hot air is drawn and removed through the hot air suction path 51. Since hot air is made to hit the outer wall surface 21 and then drawn and removed in this way, the softened front end 15a of the thinly walled tube 15 shrinks or deforms inwardly, because of the positive pressure produced by the hot air hitting the outer wall surface 21 and the negative pressure produced by drawing and removing hot air. As described above, the thinly walled tube 15 has the elliptic cross section. Therefore, the contraction along the longer axis is greater than the contraction along the short axis. Consequently, the front end 15b shows an indefinable profile as shown in FIG. 16 as if it is folded radially.

The fourth step is then conducted under this condition. As described above, the male mold 16 is lowered relative to the tube holder 17, and the front end 15b of the thinly walled tube 15 is pinched between the male mold 16 and the female mold 27, which cooperate to form a neck section 5 and a tapered shoulder section 9 by compression molding. Since the folded portion is compressed and molded under this condition, the folded portion shows phase difference, overlapping and displacement between the inner and outer layers. Thus, in the outer layer, a stretched and thus thin portion is produced extending from the neck section to the periphery of the shoulder section. In this portion where the outer layer is made thin, the intermediary layer or the inner layer can be seen in appearance. Thus, at the shoulder portion, the color of the intermediary layer can be seen in appearance along the generatrix so as to produce a marble pattern along the generatrix.

EXAMPLE 6

In this example, a thinly walled tube 15 having a three-layer structure was used. The outer layer and the inner layer were made of adhesive polyethylene and the intermediary layer was made of EVOH. The outer layer was colored to white. The inner layer was colored to pink. The intermediary layer was not colored. The total wall thickness of the thinly walled tube 15 was 0.5 mm. The thinly walled tube 15 had a longer diameter of 30 mm and a shorter diameter of 20 mm.

The internal heater 23 was used to produce hot air with temperature of 375° C. and a flow rate of 410 Nl/min. A hot air drawing power of 300 Nl/min was realized and a cooling water flow 2.2 l/min was used in the cooling section.

The external heater 25 was used to produce hot air with temperature of 400° C. and a flow rate of 380, Nl/min. A hot air drawing power of 400 Nl/min was realized and the heating was conducted for 4 seconds. The heating range covered a length of 22 mm from the front end of the thinly walled tube 15.

As a result, a good tubular container 1 was produced with a marble pattern on the neck section and the shoulder section.

As described above in detail, according to the invention, since the hot air used to heat the inner wall surface of the thinly walled tube is forcibly drawn and removed, no undesired area of the inner wall surface is heated and, since the outer wall surface of the thinly walled tube is cooled simultaneously and any possible deformation due to expansion is prevented, the profile of the thinly walled tube can be kept unchanged before and after the heating.

Additionally, since the hot air used to heat the outer wall surface of the thinly walled tube is forcibly drawn and removed, no undesired area of the outer wall surface is heated. Thus, the volume of the portion to be softened to produce the neck section can be held to a given level and the shoulder section can be made to have a desired thickness so that consequently a tubular container having a desired profile can be obtained.

According to the invention, since a tubular container is formed directly form a thinly walled tube, the tubular container is free from any parting line. Therefore, the surface of a tubular container according to the invention is highly adapted to printing. Still additionally, since a tubular container can be manufactured without causing changes in the profile of the heated thinly walled tube, so that the thinly walled tube may be subjected to a printing operation in advance and only a neck section and a shoulder section may be formed out of it in the subsequent processing steps.

If the thinly walled tube is made to have a three-layer structure having an intermediary layer sandwiched between the outer and inner layers, a flawless tubular container can be easily produced by making the inner layer thicker than the outer layer or selecting a material having a greater level of fluidity for the inner layer than the material of the outer layer.

According to the invention, the shoulder section of a tubular container can be made to bear a marble pattern when producing the tubular container.

What is claimed is:

1. A method of producing a tubular container having a neck section for receiving a cap from a thinly walled tube of thermoplastic resin, comprising:

the first step of arranging the thinly walled tube on a tube holder having a male mold for forming the neck section, a front end of the thinly walled tube projecting by a given distance from a front end of the tube holder;

the second step of softening an inside of the front end of the thinly walled tube while maintaining a profile of the front end of the thinly walled tube by discharging hot air onto an inner wall surface of the front end of the thinly walled tube, forcibly drawing the discharged air in a direction moving away from said male mold, while an outer wall surface of the front end of the thinly walled tube is cooled as a cooling surface is held in contact with the outer wall surface, to establish a temperature difference between the inside and the outside of the thinly walled tube;

the third step of shrinking the front end of the thinly walled tube by discharging hot air onto the outer wall surface of the front end of the thinly walled tube, and forcibly drawing the discharged air in the direction moving away from the male mold; and the fourth step of forming the neck section and a shoulder section from the front end of the shrunk thinly walled tube by means of a female mold cooperating with the male mold.

2. The method of producing a tubular container according to claim 1, wherein an outlet for pouring out a content is produced in the neck section at the time when the neck section and the shoulder section are formed by compression molding.

3. The method of producing a tubular container according to claim 1, wherein the thinly walled tube is a multilayer tube having at least two wall layers.

4. The method of producing a tubular container according to claim 1, wherein the thinly walled tube is a three-layer tube having an intermediary layer sandwiched by an outer layer and an inner layer, the intermediary layer is made of a material different from those of the outer and inner layers, and the inner layer has a thickness greater than that of the outer layer.

5. The method of producing a tubular container according to claim 1, wherein the thinly walled tube is a three-layer tube having an intermediary layer sandwiched by an outer layer and an inner layer, the intermediary layer is made of a material different from those of the outer and inner layers, and the material of said inner layer has a fluidity greater than that of the material of said outer layer.

6. The method of producing a tubular container according to claim 1, wherein the thinly walled tube is a three-layer tube having an intermediary layer sandwiched by an outer layer and an inner layer, the intermediary layer is made of a material different from those of the outer and inner layers, the inner layer has a thickness greater than the outer layer, and the material of said inner layer has a fluidity greater than that of the material of said outer layer.

7. An apparatus for producing a tubular container having a neck section for receiving a cap from a thinly walled tube of thermoplastic resin, comprising:

a tube holder that holds the thinly walled tube, said tube holder including a male mold for compression molding to be inserted into the thinly walled tube, said male mold being arranged inwardly in an axial direction from the front end of the thinly walled tube by a given distance, said male mold being axially movable;

an internal heater including a heating section that discharges hot air onto an inner wall surface of the front end of said thinly walled tube, a cooling section outside the heating section with an annular gap provided therebetween, said cooling section having a cooling surface that contact an outer wall surface of the front end of the thinly walled tube to cool the outer wall surface, and a hot air suction path along which the hot air is drawn axially along the annular gap and away from the thinly walled tube after the hot air heats the inner wall surface;

an external heater that discharges hot air onto the outer wall surface of the front end of said thinly walled tube, and the external heater including a hot air suction path that draws the hot air axially in the direction moving away from the thinly walled tube after the hot air heats the inner wall surface; and a female mold that forms the neck section and the shoulder section, said female mold cooperating with the male mold of said tube holder to pinch the front end of the thinly walled tube to form the neck section and the shoulder section by compression molding.

8. The apparatus for producing a tubular container according to claim 7, wherein it is further provided with a piercing device for forming an outlet in the neck section when producing the neck section and the shoulder section by means of the male mold of the tube holder and the female mold.

9. The apparatus for producing a tubular container according to claim 7, wherein the front end of the thinly walled tube held by the tube holder can be inserted into the annular gap between the cooling section and the heating section, and said heating section is provided with a loot air path therein and a hot air discharge port at a position facing the cooling section with the thinly walled tube disposed therebetween.

10. The apparatus for producing a tubular container according to claim 7, wherein the external heater includes an annular heating section provided with a hot air path therein, the front end of the thinly walled tube held by the tube holder can be inserted into the inside of the heating section, a suction path is connected to the inside of the heating section, and said heating section is provided with a hot air discharge port on the inner wall surface facing the front end of the inserted thinly walled tube.

11. A method of producing a tubular container having a neck section for receiving a cap from a thinly walled tube having at least inner and outer layers of different colors, the tube being made of thermoplastic resin and having an elliptic cross section including a long axis and a short axis, to form a marble pattern on the tubular container, comprising:

the first step of arranging the thinly walled tube on a tube holder having a male mold for forming the neck section, a front end of the thinly walled tube projecting by a given distance from a front end of the tube holder;

the second step of softening an inside of the front end of the thinly walled tube while maintaining a profile of the front end of the thinly walled tube, by discharging hot air onto an inner wall surface of the front end of the thinly walled tube, forcibly drawing the discharged air in a direction moving away from said male mold, while cooling an outer wall surface of the front end of the thinly walled tube, to establish a temperature difference between the inside and the outside of the thinly walled tube;

the third step of shrinking the front end of the thinly walled tube by discharging hot air onto the outer wall surface of the front end of the thinly walled tube to stretch the outer layer to thereby produce a thin portion in the outer layer wherein contraction along the long axis is greater than contraction along the long axis is greater than contraction along the short axis, and forcibly drawing the discharged air in the direction moving away from the male mold; and the fourth step of forming the neck section and a shoulder section from the front end of the shrunk thinly walled tube by means of a female mold cooperating with the male mold so that the inner layer can be seen through the thin portion of the outer layer, thus forming the marbled pattern.

12. An apparatus for producing a tubular container having a neck section for receiving a cap from a thinly walled tube of thermoplastic resin, comprising:

a tube holder that holds the thinly walled tube, said tube holder including a male mold for compression molding to be inserted into the thinly walled tube, said male mold being arranged inwardly in an axial direction from the front end of the thinly walled tube by a given distance, said male mold being axially movable;

an internal heater that discharges hot air onto an inner wall surface of the front end of said thinly walled tube;

an external heater that discharges hot air onto the outer wall surface of the front end of said thinly walled tube; and a female mold that forms the neck section and the shoulder section, said female mold cooperating with the male mold of said tube holder to pinch the front end of the thinly walled tube to form the neck section and the shoulder section by compression molding, wherein the internal heater includes an annular cooling section for cooling the outer wall surface of the front end of the thinly walled tube, a heating section arranged inside the cooling section with an annular gap provided therebetween, and a hot air suction path communicating with the annular gap between the cooling section and the heating section, the front end of the thinly walled tube held by the tube holder can be inserted into the annular gap between the cooling section and the heating section, and said heating section is provided with a hot air path therein and a hot air discharge port at a position facing the cooling section with the thinly walled tube disposed therebetween.

13. An apparatus for producing a tubular container having a neck section for receiving a cap from a thinly walled tube of thermoplastic resin, comprising:

a tube holder that holds the thinly walled tube, said tube holder including a male mold for compression molding to be inserted into the thinly walled tube, said male mold being arranged inwardly in an axial direction from the front end of the thinly walled tube by a given distance, said male mold being axially movable;

an internal heater that discharges hot air onto an inner wall surface of the front end of said thinly walled tube;

an external heater that discharges hot air onto the outer wall surface of the front end of said thinly walled tube; and a female mold that forms the neck section and the shoulder section, said female mold cooperating with the male mold of said tube holder to pinch the front end of the thinly walled tube to form the neck section and the shoulder section by compression molding, wherein the external heater includes an annular heating section provided with a hot air path therein, the front end of the thinly walled tube held by the tube holder can be inserted into the inside of the heating section, a suction path is connected to the inside of the heating section, and said heating section is provided with a hot air discharge port on the inner wall surface facing the front end of the inserted thinly walled tube.

\* \* \* \* \*